US010018266B2

(12) United States Patent
Muto et al.

(10) Patent No.: US 10,018,266 B2
(45) Date of Patent: Jul. 10, 2018

(54) TRANSMISSION

(71) Applicant: HONDA MOTOR CO., LTD., Tokyo (JP)

(72) Inventors: Akio Muto, Wako (JP); Yoshiaki Shutou, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/538,797

(22) PCT Filed: Nov. 24, 2015

(86) PCT No.: PCT/JP2015/082908
§ 371 (c)(1),
(2) Date: Jun. 22, 2017

(87) PCT Pub. No.: WO2016/114007
PCT Pub. Date: Jul. 21, 2016

(65) Prior Publication Data
US 2017/0350498 A1    Dec. 7, 2017

(30) Foreign Application Priority Data
Jan. 14, 2015 (JP) .................... 2015-004641

(51) Int. Cl.
*F16H 57/04* (2010.01)
(52) U.S. Cl.
CPC ..... *F16H 57/0413* (2013.01); *F16H 57/0424* (2013.01); *F16H 57/0426* (2013.01);
(Continued)
(58) Field of Classification Search
CPC ............. F16H 57/0413; F16H 57/0412; F16H 57/0445; F16H 57/0426; F16H 57/0424; F16H 57/0421; F16H 57/0483
See application file for complete search history.

(56) References Cited

U.S. PATENT DOCUMENTS 3,441,106 A * 4/1969 Benjamin ........... F16H 57/0483
184/10
5,906,557 A   5/1999 Kobayashi
(Continued)

FOREIGN PATENT DOCUMENTS

CN      1521428 A    8/2004
CN    102287522 A   12/2011
(Continued)

OTHER PUBLICATIONS

International Search Report dated Feb. 9, 2016, issued in counterpart International Application No. PCT/JP2015/082908 (2 pages).
(Continued)

*Primary Examiner* — Erin D Bishop
(74) *Attorney, Agent, or Firm* — Westerman, Hattori, Daniels & Adrian, LLP

(57) ABSTRACT

Since an oil level of oil in a first space housing a transmission mechanism is lower than an oil level of the oil in a second space housing a differential gear, not only is it possible to lubricate a drive pinion and a ring gear housed in the second space with a sufficient amount of oil while cutting the total amount of oil compared with a case in which the oil levels of the first space and the second space are both high, but it is also possible to reduce the resistance of oil to stirring in the second space by discharging excess oil building up in the second space to the first space via a second oil passage formed along an axial center of a pinion shaft, and to prevent the oil level of the first space from decreasing excessively, thus avoiding aeration of an oil pump.

7 Claims, 7 Drawing Sheets

(52) U.S. Cl.
CPC ..... *F16H 57/0441* (2013.01); *F16H 57/0445* (2013.01); *F16H 57/0483* (2013.01); *F16H 57/0493* (2013.01); *F16H 57/0447* (2013.01)

(56) References Cited

U.S. PATENT DOCUMENTS

| | | | | |
|---|---|---|---|---|
| 5,989,143 | A * | 11/1999 | Bell | F16H 57/0421 184/11.2 |
| 6,502,665 | B1 * | 1/2003 | Brehob | F16H 57/0483 184/11.2 |
| 6,770,005 | B2 * | 8/2004 | Aikawa | B60K 1/00 475/231 |
| 6,964,320 | B2 | 11/2005 | Metelues et al. | |
| 7,059,443 | B2 * | 6/2006 | Kira | B60K 6/26 180/243 |
| 8,651,239 | B2 | 2/2014 | Aida | |
| 2008/0182712 | A1 * | 7/2008 | Kira | B60K 6/26 477/7 |

FOREIGN PATENT DOCUMENTS

| | | |
|---|---|---|
| CN | 102434663 A | 5/2012 |
| CN | 203009797 U | 6/2013 |
| CN | 104246309 A | 12/2014 |
| CN | 205298483 U | 6/2016 |
| JP | 8-14368 A | 1/1996 |
| JP | 2000-337485 A | 12/2000 |
| JP | 4104091 B2 | 6/2008 |
| JP | 2011-99547 A | 5/2011 |
| WO | 2013/143809 A1 | 10/2013 |

OTHER PUBLICATIONS

Office Action dated Jan. 26, 2018, issued in counterpart Chinese Application No. 201580069273.4, with English translation (10 pages).

* cited by examiner

TRANSMISSION

TECHNICAL FIELD

The present invention relates to a transmission that includes a first space housing a transmission mechanism, a second space housing a differential gear, and a pinion shaft having provided at one end thereof a final driven gear to which a driving force from the transmission mechanism is transmitted and at the other end a drive pinion transmitting the driving force to a ring gear of the differential gear.

BACKGROUND ART

A transmission in which a hypoid pinion provided on an output shaft of the transmission is meshed with a hypoid ring gear provided on a case of a differential gear, and by opening an axial oil passage formed in the interior of the output shaft at the center of the hypoid pinion, oil that is taken around by rotation of the hypoid ring gear is introduced into the axial oil passage of the output shaft and the oil is supplied to a section to be lubricated of the transmission via a radial oil passage formed in the interior of the output shaft is known from Patent Document 1 below.

RELATED ART DOCUMENTS

Patent Documents

Patent Document 1: Japanese Patent No. 4104091

SUMMARY OF THE INVENTION

Problems to be Solved by the Invention

Since the hypoid pinion and the hypoid ring gear carry out power transmission by means of a plurality of gear teeth simultaneously meshing with each other, the durability and quietness are excellent compared with a normal bevel gear, but since the gear teeth make contact with each other while slipping, it is necessary to carry out lubrication and cooling by supplying a sufficient amount of oil.

However, in the above conventional transmission, since a first space housing an input shaft, the output shaft, a transmission gear, etc. and a second space housing the differential gear, the hypoid pinion, the hypoid ring gear, etc. communicate with each other without being partitioned, when the oil level of the second space is set high so that the hypoid pinion and the hypoid ring gear are submerged under the oil surface, the oil level for the first space becomes higher than necessary, and there are the problems that the total amount of oil in the transmission increases and the resistance of oil toward being stirred by the transmission gear increases.

The present invention has been accomplished in light of the above circumstances, and it is an object thereof to ensure the lubrication performance of a drive pinion and a ring gear for transmitting the driving force of a transmission mechanism to a differential gear without increasing the total amount of oil in the transmission.

Means for Solving the Problems

In order to attain the above object, according to a first aspect of the present invention, there is provided a transmission comprising a first space housing a transmission mechanism, a second space housing a differential gear, and a pinion shaft having provided at one end thereof a final driven gear to which a driving force from the transmission mechanism is transmitted and at the other end a drive pinion transmitting the driving force to a ring gear of the differential gear, wherein the transmission comprises an oil pump disposed in the first space, an oil cooler for cooling oil supplied from the oil pump, a first oil passage for supplying oil that has been cooled by the oil cooler to the second space, and a second oil passage formed along an axial center of the pinion shaft and supplying oil of the second space to the first space, and an oil level of oil of the second space is higher than an oil level of oil of the first space.

Further, according to a second aspect of the present invention, in addition to the first aspect, the first oil passage supplies oil to an upper side of the drive pinion.

Furthermore, according to a third aspect of the present invention, in addition to the first or second aspect, a transmission case is provided with a third oil passage for guiding oil issued from the second oil passage to a suction port communicating with the oil pump.

Moreover, according to a fourth aspect of the present invention, in addition to any one of the first to third aspects, a blade member is provided in an opening on the second space side of the second oil passage, and rotation of the pinion shaft when a vehicle travels forward makes the blade member suck in oil of the second space into the second oil passage.

An oil passage 11c of an embodiment corresponds to the first oil passage of the present invention, a rear case 12 of the embodiment corresponds to the transmission case of the present invention, an oil passage 12c of the embodiment corresponds to the third oil passage of the present invention, a differential gear housing chamber 16 of the embodiment corresponds to the second space of the present invention, a transmission mechanism housing chamber 18 of the embodiment corresponds to the first space of the present invention, an oil passage 32a of the embodiment corresponds to the second oil passage of the present invention, a hypoid pinion 33 of the embodiment corresponds to the drive pinion of the present invention, a hypoid ring gear 34 of the embodiment corresponds to the ring gear of the present invention, and a main oil cooler 36 of the embodiment corresponds to the oil cooler of the present invention.

Effects of the Invention

In accordance with the first aspect of the present invention, the transmission includes the first space housing the transmission mechanism, the second space housing the differential gear, and the pinion shaft having provided at one end the final driven gear to which the driving force from the transmission mechanism is transmitted and at the other end the drive pinion transmitting the driving force to the ring gear of the differential gear. The oil that has been supplied from the oil pump disposed in the first space to the oil cooler and cooled is supplied to the second space via the first oil passage, lubricates the drive pinion and the ring gear therein, and is then returned to the first space via the second oil passage formed along the axial center of the pinion shaft. Since the oil level of the oil in the first space is lower than the oil level of the oil in the second space, not only is it possible to lubricate the drive pinion and the ring gear housed in the second space with a sufficient amount of oil while cutting the total amount of oil compared with a case in which the oil levels of the first space and the second space are both high, but it is also possible to reduce the resistance of oil to stirring in the second space by discharging excess oil building up in the second space to the first space via the second oil passage, and to prevent the oil level of the first space from decreasing excessively, thus avoiding aeration of the oil pump.

Furthermore, in accordance with the second aspect of the present invention, since the first oil passage supplies oil to the upper side of the drive pinion, it is possible to carry out lubrication efficiently by directly supplying to the drive pinion the oil that has passed through the oil cooler and been cooled.

Moreover, in accordance with the third aspect of the present invention, since the transmission case is provided with the third oil passage for guiding oil issued from the second oil passage to the suction port communicating with the oil pump, it is possible to rapidly supply the oil whose temperature has risen after lubricating the drive pinion and the ring gear to the oil cooler via the oil pump and cool it.

Furthermore, in accordance with the fourth aspect of the present invention, since the blade member is provided in the opening on the second space side of the second oil passage, and rotation of the pinion shaft when the vehicle travels forward makes the blade member suck in oil of the second space into the second oil passage, it is possible to reliably and efficiently discharge the oil in the second space to the first space.

EXPLANATION OF REFERENCE NUMERALS AND SYMBOLS

Figure 1:
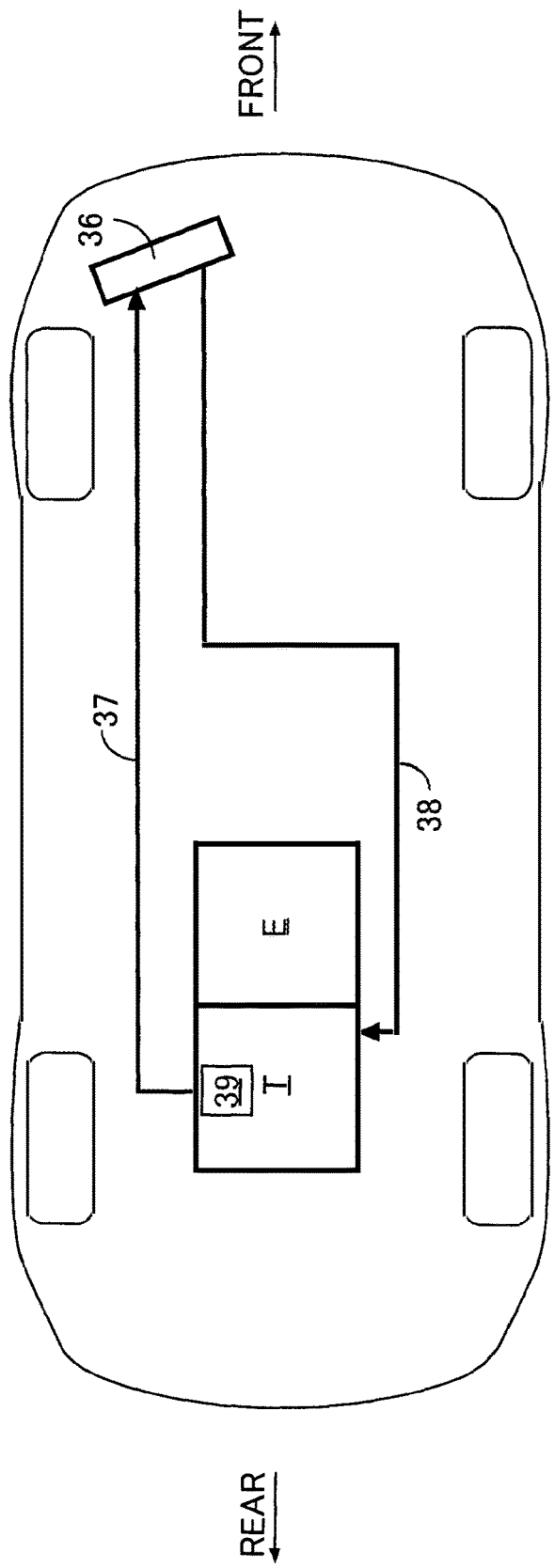
FIG. 1 is a diagram showing the arrangement of an oil cooling system of an automobile transmission. (first embodiment)

11c Oil passage (first oil passage)
12 Rear case (transmission case)
12c Oil passage (third oil passage)
16 Differential gear housing chamber (second space)
17 Differential gear
18 Transmission mechanism housing chamber (first space)
32 Pinion shaft
32a Oil passage (second oil passage)
33 Hypoid pinion (drive pinion)
34 Hypoid ring gear (ring gear)
36 Main oil cooler (oil cooler)
39 Oil pump
43a Suction port
49 Blade member
50 Final driven gear
L1 Oil level of second space
L2 Oil level of first space Modes for Carrying Out the Invention An embodiment of the present invention is explained below by reference to FIG. 1 to FIG. 7.

First Embodiment

Figure 3:
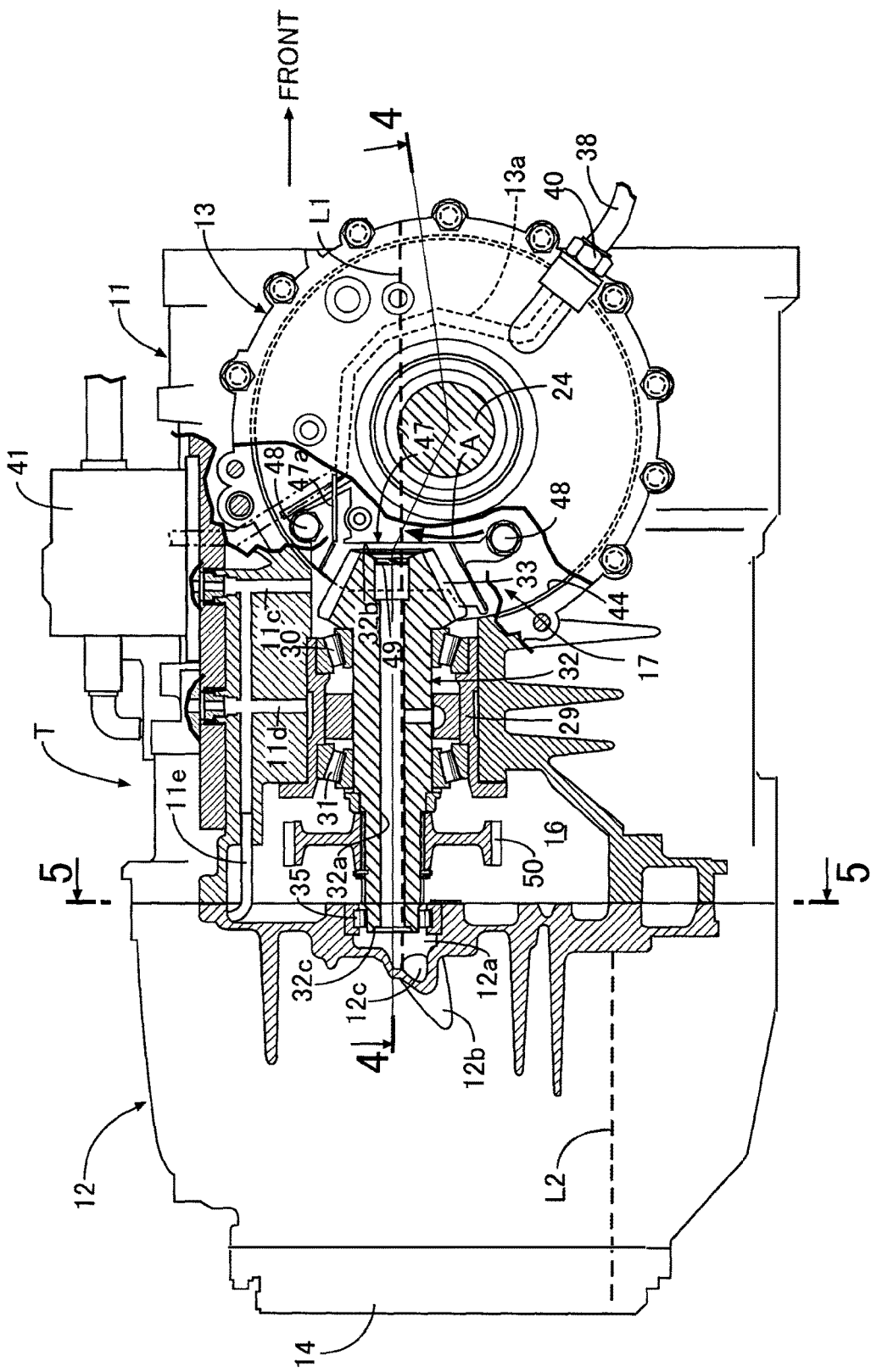
FIG. 3 is a sectional view along line 3-3 in FIG. 2. (first embodiment)

As shown in FIG. 1 and FIG. 3, an engine E is mounted longitudinally on a middle part in the fore-and-aft direction of a vehicle body of a mid-engined vehicle, and a transmission T is connected to a rear part of the engine E. The transmission T includes a front case 11 joined to the rear end of the engine E and a rear case 12 connected to the rear end of the front case 11; an opening at the right end of the front case 11 is blocked by a side cover 13, and an opening at the rear end of the transmission case is blocked by a rear cover 14.

Figure 2:
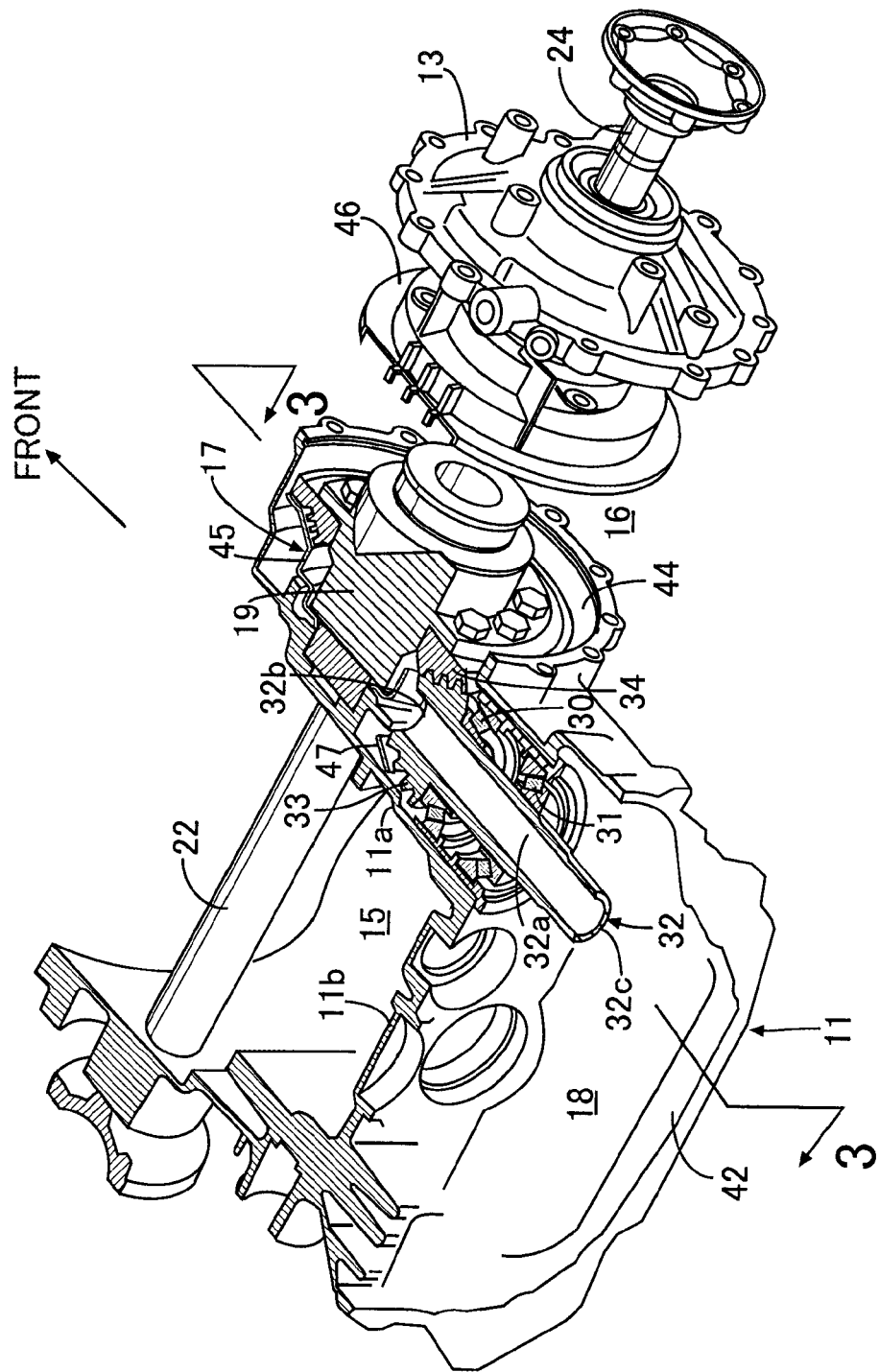
FIG. 2 is a partially cutaway perspective view of the transmission. (first embodiment)

As shown in FIG. 2, the front case 11 is partitioned into a clutch housing chamber 15 on the left side and a differential gear housing chamber 16 on the right side by means of a first partition wall 11a extending in the fore-and-aft direction; the clutch housing chamber 15 houses a clutch, which is not illustrated, and the differential gear housing chamber 16 houses a differential gear 17. The front case 11 includes a second partition wall 11b extending in the vehicle width direction, and a dual clutch type transmission mechanism, which is not illustrated, is housed in a transmission mechanism housing chamber 18 defined by the rear case 12 and the front case 11 to the rear of the second partition wall 11b.

Figure 4:
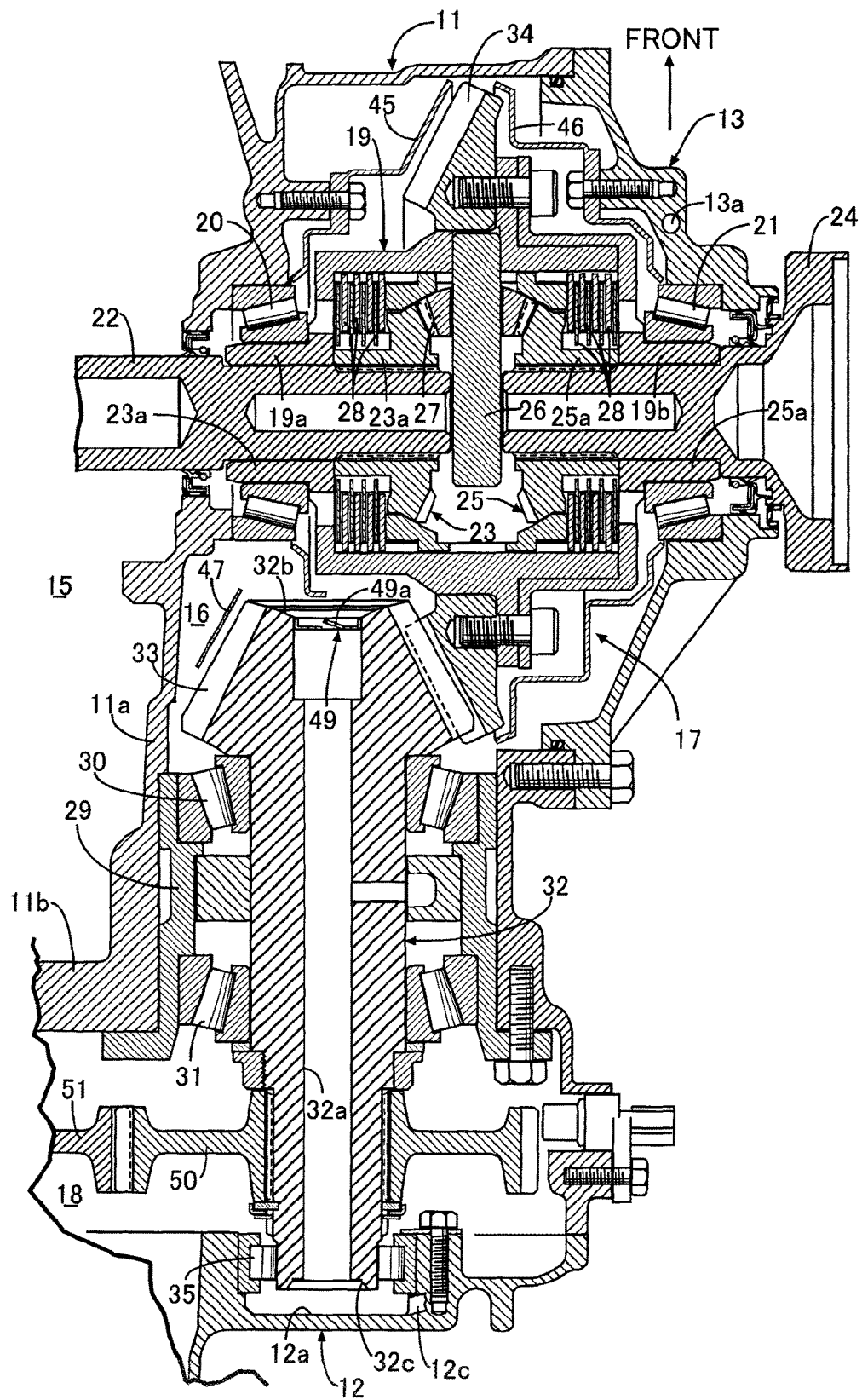
FIG. 4 is a sectional view along line 4-4 in FIG. 3. (first embodiment)
Figure 5:
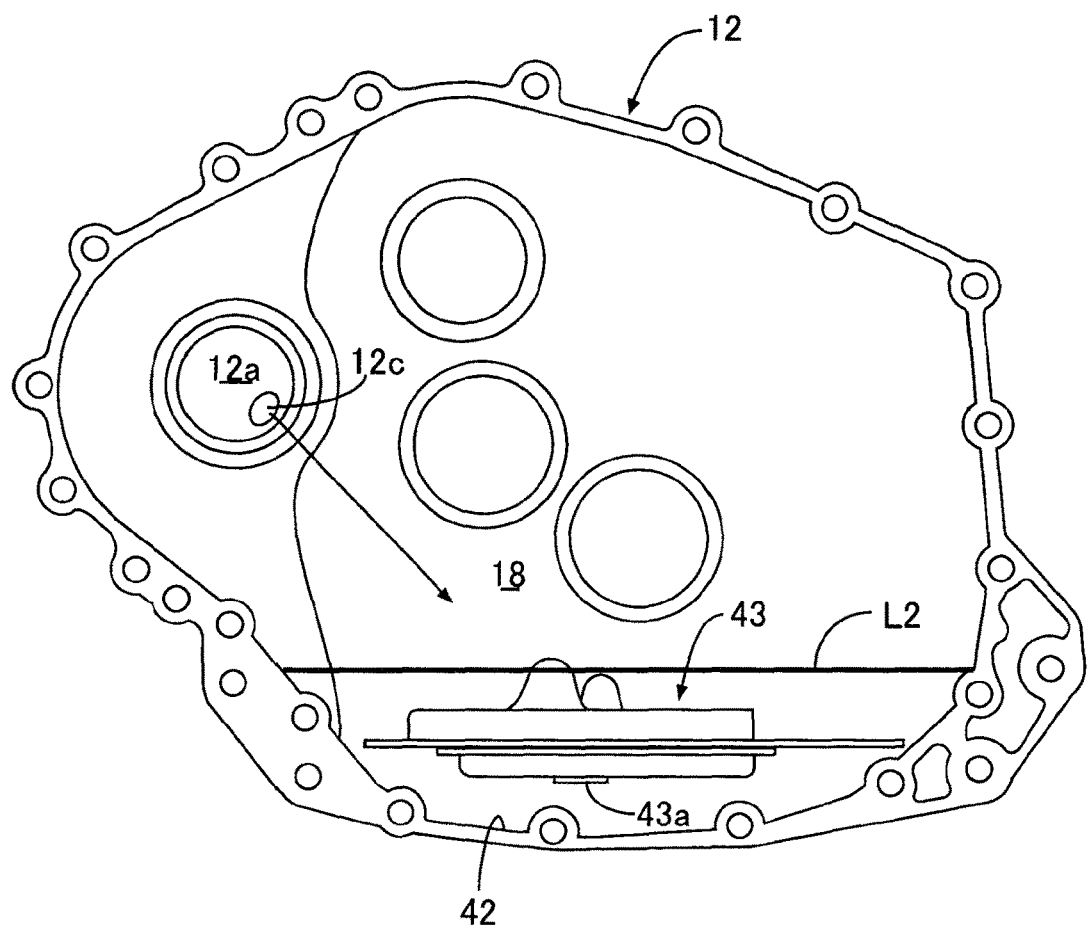
FIG. 5 is a view from arrowed line 5-5 in FIG. 3. (first embodiment)

As shown in FIG. 4, with regard to a gear case 19 of the differential gear 17, a tubular shaft portion 19a on the left side is rotatably supported on the first partition wall 11a of the front case 11 via a roller bearing 20, and a tubular shaft portion 19b on the right side is rotatably supported on the side cover 13 of the front case 11 via a roller bearing 21. The right end of an in-board shaft 22 on the left side extends through the first partition wall 11a of a clutch case and the shaft portion 19a on the left side of the gear case 19 and is spline joined to the inner periphery of a differential side gear 23 on the left side. The left end of an in-board shaft 24 on the right side extends through the side cover 13 of the clutch case and the shaft portion 19b on the right side of the gear case 19 and is spline joined to the inner periphery of a differential side gear 25 on the right side. A differential pinion 27 rotatably supported on a pinion shaft 26 fixed to the interior of the gear case 19 meshes with the left and right differential side gears 23 and 25.

Outer peripheries of tubular shaft portions 23a and 25a of the left and right differential side gears 23 and 25 and the inner periphery of the gear case 19 are connected by means of a large number of friction plates 28 that are pressed into contact with each other so as to overlap in the axial direction. The frictional force generated by the friction plates 28 suppresses rotation of the left and right differential side gears 23 and 25 relative to the gear case 19, thus imparting a limited-slip differential function to the differential gear 17.

A pinion shaft 32 is rotatably supported, via a pair of roller bearings 30 and 31, on a bearing holder 29 inserted into a front part of the differential gear housing chamber 16 from the rear, and a hypoid pinion 33 formed integrally with the front end of the pinion shaft 32 meshes with a hypoid ring gear 34 fixed to the outer periphery of the gear case 19 of the differential gear 17. The rear end of the pinion shaft 32, which projects into the interior of the rear case 12, is supported by the rear case 12 via a roller bearing 35, and a final driven gear 50 fixedly provided on a rear part of the pinion shaft 32 meshes with a final drive gear 51 of the dual clutch type transmission mechanism.

Therefore, the driving force outputted from the dual clutch type transmission mechanism is transmitted to a driven wheel via the path: final drive gear 51→ final driven gear 50→ pinion shaft 32→ hypoid pinion 33→ hypoid ring gear 34→ gear case 19→ pinion shaft 26→ differential pinion 27→ differential side gears 23 and 25→ in-board shafts 22 and 24.

The structure of a lubrication system of the transmission T is now explained.

As shown in FIG. 1, a main oil cooler 36 for cooling oil (ATF) of the transmission T by means of the flow of air is disposed in a front part of the vehicle body, the main oil cooler 36 and a lower left face of the transmission T are connected via first piping 37, and the main oil cooler 36 and a lower right face of the transmission T are connected via second piping 38. A hydraulic circuit for carrying out shift control is housed in the interior of the transmission T, and oil of the transmission T is circulated via the path: first piping 37→ main oil cooler 36→ second piping 38→ transmission T by means of an oil pump 39 provided in the hydraulic circuit.

As shown in FIG. 3, the downstream end of the second piping 38 is connected to a lower front part of the side cover 13 of the front case 11 via a coupling 40, and an oil passage 13a extending from the coupling 40 upward through the interior of the side cover 13 is connected to an inlet of an auxiliary oil cooler 41 supported on an upper face of the front case 11. An outlet of the auxiliary oil cooler 41 communicates with an upper part of the differential gear housing chamber 16 via oil passages 11c and 11d and communicates with the transmission mechanism housing chamber 18 formed in the rear case 12 via another oil passage 11e.

An oil passage 32a extends through the center of the pinion shaft 32 in the axial direction, an inlet opening 32b on the hypoid pinion 33 side of the oil passage 32a communicates with the interior of the differential gear housing chamber 16, and an outlet opening 32c, on the side opposite to the hypoid pinion 33, of the oil passage 32a communicates with an oil chamber 12a formed between the rear case 12 and the roller bearing 35 supporting the pinion shaft 32. The oil chamber 12a communicates with an upper part of the transmission mechanism housing chamber 18 via an oil passage 12c formed within a rib 12b projecting from an outer face of the rear case 12 (see FIG. 5). An outlet of the oil passage 12c is directed obliquely downward toward a suction port 43a of an oil strainer 43 disposed in an oil reservoir 42 in a bottom part of the transmission mechanism housing chamber 18. The oil strainer communicates with the oil pump 39 for discharging oil to the first piping 37.

As shown in FIG. 2 and FIG. 4, in order to prevent agitation of the oil level of an oil reservoir 44 due to rotation of the hypoid ring gear 34, a left baffle plate 45 and a right baffle plate 46 are disposed in the interior of the differential gear housing chamber 16 so as to sandwich left and right side faces of the differential gear 17.

Figure 6:
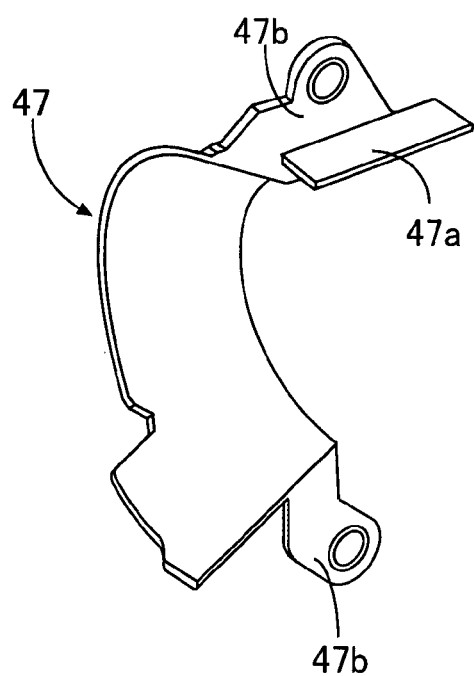
FIG. 6 is a perspective view of a deflector plate. (first embodiment)

As shown in FIG. 3 and FIG. 6, fixed to the first side wall 11a of the front case 11 by means of two bolts 48 and 48 are two mounting portions 47b and 47b of a deflector plate 47 having a protruding portion 47a covering the inlet opening 32b of the pinion shaft 32 from above.

Figure 7:
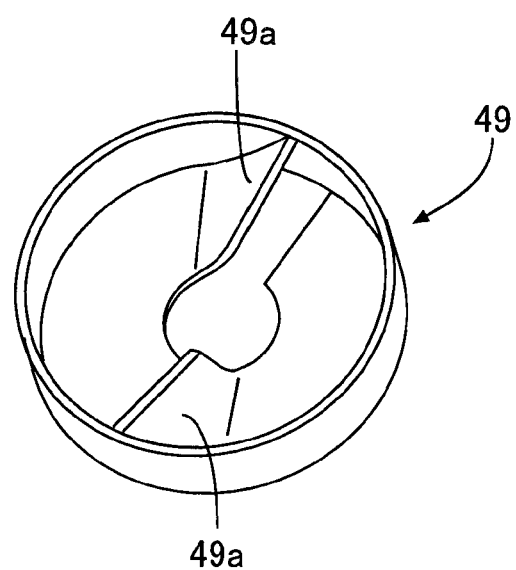
FIG. 7 is a perspective view of a blade member. (first embodiment)

As shown in FIG. 4 and FIG. 7, a cap-shaped blade member 49 having two twisted blades 49a and 49a is fixed by press fitting into the inlet opening 32b of the pinion shaft 32.

The operation of the embodiment of the present invention having the above arrangement is now explained.

As shown in FIG. 1 and FIG. 3, high temperature oil stored in a bottom part of the oil reservoir 42 of the transmission mechanism housing chamber 18 of the rear case 12 is supplied to the main oil cooler 36 via the first piping 37 by means of the oil pump 39, and low temperature oil that has passed through the main oil cooler 36 and been cooled is supplied to the auxiliary oil cooler 41 via the second piping 38, the coupling 40, and the oil passage 13a of the side cover 13.

Part of the oil that has passed through the auxiliary oil cooler 41 and been further cooled is supplied to a part where the hypoid pinion 33 meshes with the hypoid ring gear 34 within the differential gear housing chamber 16 from a lower face of the auxiliary oil cooler 41 via the oil passage 11c of the front case 11, another part thereof is supplied to the pair of roller bearings 30 and 31 supporting the pinion shaft 32 via the oil passage 11d of the front case 11, and the remainder is supplied to the dual clutch type transmission mechanism of the transmission mechanism housing chamber 18 formed in the rear case 12 via the oil passage 11e of the front case 11.

Oil that has been supplied from the oil passages 11c and 11d to the differential gear housing chamber 16 and stored in the oil reservoir 44 is agitated by means of the hypoid ring gear 34, which is rotating, and is scattered in the direction of arrow A in FIG. 3, thus lubricating a section to be lubricated within the differential gear housing chamber 16. In this process, part of the oil that has been agitated by the hypoid ring gear 34 collides with a lower face of the protruding portion 47a of the deflector plate 47, changes direction downward, and is actively sucked into the oil passage 32a of the pinion shaft 32 by means of the blades 49a and 49a of the blade member 49 provided in the inlet opening 32b of the pinion shaft 32 opening therein. The direction in which the blades 49a and 49a of the blade member 49 are twisted is set so that oil is sucked into the oil passage 32a of the pinion shaft 32 when the vehicle travels forward, which occurs more frequently.

Oil that has been supplied from the outlet opening 32c of the pinion shaft 32 to the oil chamber 12a is discharged to the oil reservoir 42 of the bottom part of the transmission mechanism housing chamber 18 via the oil passage 12c within the rib 12b of the rear case 12 (see FIG. 5), passes through the oil strainer 43 disposed in the oil reservoir 42 and is filtered, and is then supplied to the first piping 37 by means of the oil pump 39.

Since the gear teeth of the hypoid pinion 33 and the gear teeth of the hypoid ring gear 34 make contact with each other while slipping, unless lubrication and cooling is carried out with a sufficient amount of oil, there is a possibility that scoring will occur on the surface of the teeth and the durability will be affected. If the differential gear housing chamber 16 and the transmission mechanism housing chamber 18 were made to communicate with each other by an oil hole provided in a bottom part of the second partition wall 11b of the front case 11, since the oil level of the differential gear housing chamber 16 and the oil level of the transmission mechanism housing chamber 18 would be the same, it would not be possible for the oil level of the differential gear housing chamber 16 to be maintained at a sufficiently high position, and it would be difficult to lubricate the hypoid pinion 33 and the hypoid ring gear 34 sufficiently. If in order to prevent this, the total amount of oil were to be increased and both the oil level of the differential gear housing chamber 16 and the oil level of the transmission mechanism housing chamber 18 were to be set high, the oil level of the transmission mechanism housing chamber 18 would become excessively high, and there would be the problems that the resistance of the oil to being stirred by the transmission mechanism would increase and the weight of the transmission T would increase due to the large amount of oil.

However, in accordance with the present embodiment, as shown in FIG. 3, since the oil level L1 of the differential gear housing chamber 16 is set higher than the oil level L2 of the transmission mechanism housing chamber 18 by discharging oil of the differential gear housing chamber 16 to the transmission mechanism housing chamber 18 via the oil passage 32a of the pinion shaft 32, it is possible to reduce the stirring resistance and the weight by preventing excessive oil from building up in the transmission mechanism housing chamber 18 while ensuring the lubrication performance for the hypoid pinion 33 and the hypoid ring gear 34. Moreover, since part of oil that has passed through the auxiliary oil cooler 41 is supplied to the part where the hypoid pinion 33 meshes with the hypoid ring gear 34, it is possible to further reliably lubricate the hypoid pinion 33 and the hypoid ring gear 34.

Furthermore, if the oil level L1 of the differential gear housing chamber 16 were to increase excessively, the resistance of oil to being stirred by the gear case 19 and the hypoid ring gear 34 of the differential gear 17 would increase, but in accordance with the present embodiment since oil that has been agitated by the hypoid ring gear 34, which rotates in the direction of the arrow A in FIG. 3, collides with the protruding portion 47a of the deflector plate 47 and changes direction downward and is positively sucked into the oil passage 32a of the pinion shaft 32 by means of the blade member 49 provided in the inlet opening 32b of the pinion shaft 32 opening therein, it is possible to reliably discharge excessive oil within the differential gear housing chamber 16 to the transmission mechanism housing chamber 18 via the oil passage 32a of the pinion shaft 32, thereby enabling the oil level L1 of the differential gear housing chamber 16 to always be maintained appropriately.

Moreover, since excessive oil does not build up within the differential gear housing chamber 16, it is also possible to maintain the oil level L2 of the transmission mechanism housing chamber 18 appropriately, thereby preventing poor lubrication of the transmission mechanism or aeration of the oil pump 39 due to the oil level L2 decreasing excessively. In particular, since oil that has been discharged to the transmission mechanism housing chamber 18 from the oil passage 32a of the pinion shaft 32 via the oil passage 12c of the rear case 12 is directed to the suction port 43a of the oil strainer 43 communicating with the oil pump 39, it is possible to rapidly supply the oil that has lubricated the hypoid pinion 33 or the hypoid ring gear 34 and has increased in temperature to the main oil cooler 36 via the oil pump 39 and cool it.

An embodiment of the present invention is explained above, but the present invention may be modified in a variety of ways as long as the modifications do not depart from the spirit and scope thereof.

For example, the drive pinion and the ring gear of the present invention are not limited to the hypoid pinion 33 and the hypoid ring gear 34 of the embodiment and may be any type of gear such as a bevel gear.

Furthermore, the transmission mechanism of the present invention is not limited to the dual clutch type transmission mechanism of the embodiment.

The invention claimed is:

1. A transmission comprising a first space housing a transmission mechanism, a second space housing a differential gear, and a pinion shaft having provided at one end thereof a final driven gear to which a driving force from the transmission mechanism is transmitted and at the other end a drive pinion transmitting the driving force to a ring gear of the differential gear,
wherein the transmission comprises an oil pump disposed in the first space, an oil cooler for cooling oil supplied from the oil pump, a first oil passage for supplying oil that has been cooled by the oil cooler to the second space, and a second oil passage formed along an axial center of the pinion shaft and supplying oil of the second space to the first space, and an oil level of oil of the second space is higher than an oil level of oil of the first space.

2. The transmission according to claim 1, wherein the first oil passage supplies oil to an upper side of the drive pinion.

3. The transmission according to claim 2, wherein a transmission case is provided with a third oil passage for guiding oil issued from the second oil passage to a suction port communicating with the oil pump.

4. The transmission according to claim 2, wherein a blade member is provided in an opening on the second space side of the second oil passage, and rotation of the pinion shaft when a vehicle travels forward makes the blade member suck in oil of the second space into the second oil passage.

5. The transmission according to claim 1, wherein a transmission case is provided with a third oil passage for guiding oil issued from the second oil passage to a suction port communicating with the oil pump.

6. The transmission according to claim 5, wherein a blade member is provided in an opening on the second space side of the second oil passage, and rotation of the pinion shaft when a vehicle travels forward makes the blade member suck in oil of the second space into the second oil passage.

7. The transmission according to claim 1,
wherein a blade member is provided in an opening on the second space side of the second oil passage, and rotation of the pinion shaft when a vehicle travels forward makes the blade member suck in oil of the second space into the second oil passage.

* * * * *